(12) United States Patent
Perdue et al.

(10) Patent No.: US 10,241,211 B2
(45) Date of Patent: Mar. 26, 2019

(54) METHODS OF LOCATION USING GNSS SIMULATORS AND DEVICES THEREOF

(71) Applicant: Spectracom Corporation, Rochester, NY (US)

(72) Inventors: Lisa Perdue, Macedon, NY (US); David Sohn, Pittsford, NY (US); Paul Myers, Pittsford, NY (US)

(73) Assignee: Spectracom Corporation, Rochester, NY (US)

(*) Notice: Subject to any disclaimer, the term of this patent is extended or adjusted under 35 U.S.C. 154(b) by 321 days.

(21) Appl. No.: 15/140,086

(22) Filed: Apr. 27, 2016

(65) Prior Publication Data

US 2016/0320491 A1    Nov. 3, 2016

Related U.S. Application Data

(60) Provisional application No. 62/155,808, filed on May 1, 2015.

(51) Int. Cl.
| | |
|---|---|
| *G01S 19/05* | (2010.01) |
| *G01S 19/11* | (2010.01) |
| *G01S 19/25* | (2010.01) |
| *G01S 19/13* | (2010.01) |

(52) U.S. Cl.
CPC .............. *G01S 19/11* (2013.01); *G01S 19/05* (2013.01); *G01S 19/258* (2013.01); *G01S 19/13* (2013.01); *G01S 19/25* (2013.01)

(58) Field of Classification Search
CPC ........ G01S 19/11; G01S 19/258; G01S 19/05; G01S 19/13; G01S 19/25

USPC .......................... 342/357.42, 357.48, 357.64
See application file for complete search history.

(56) References Cited

U.S. PATENT DOCUMENTS

| | | | | |
|---|---|---|---|---|
| 5,995,042 A * | 11/1999 | Durboraw, III | ....... | G01S 19/215 342/357.58 |
| 6,188,353 B1 * | 2/2001 | Mitchell | ................ | G01S 1/042 342/386 |
| 6,707,424 B1 * | 3/2004 | Snyder | ..................... | G01S 5/14 342/357.29 |
| 6,727,846 B1 * | 4/2004 | Brown | .................... | G01S 19/22 342/357.63 |
| 7,250,903 B1 | 7/2007 | McDowell | | |
| 7,456,783 B2 | 11/2008 | Joo et al. | | |
| 7,522,101 B2 * | 4/2009 | Homiller | ............. | G01C 21/206 342/357.48 |
| 7,598,907 B2 * | 10/2009 | Thome | ................... | G01S 19/25 342/357.64 |

(Continued)

*Primary Examiner* — Chuong P Nguyen
(74) *Attorney, Agent, or Firm* — LeClairRyan PLLC

(57) ABSTRACT

A method, GNSS simulator, and non-transitory computer readable medium for providing a simulated global navigation satellite system (GNSS) signal. The method includes receiving, by a GNSS simulator, a precision timing signal and one or more items of ephemeris data from a GNSS receiver based on a decoded GNSS signal received by the GNSS receiver. The precision timing signal and the one or more items of GNSS ephemeris data are received in a digital format over a communication network. A simulated GNSS signal is generated, by the GNSS simulator, based on the received precision timing signal and one or more items of ephemeris data. The simulated GNSS signal is transmitted, by the GNSS simulator, over a coverage area. A GNSS system for providing a simulated GNSS signal is also disclosed.

40 Claims, 5 Drawing Sheets

(56) References Cited

U.S. PATENT DOCUMENTS

| | | | |
|---|---|---|---|
| 8,669,943 B2 | 3/2014 | Trent, Jr. et al. | |
| 8,854,260 B2 | 10/2014 | Boulton | |
| 9,158,001 B2* | 10/2015 | Ariel | G01S 19/11 |
| 2006/0208946 A1* | 9/2006 | Bailey | G01S 19/11 |
| | | | 342/386 |
| 2009/0121927 A1* | 5/2009 | Moshfeghi | G01S 19/07 |
| | | | 342/357.24 |
| 2012/0007776 A1* | 1/2012 | Ariel | G01S 19/11 |
| | | | 342/357.48 |
| 2013/0345967 A1* | 12/2013 | Pakzad | G01C 21/206 |
| | | | 701/431 |
| 2014/0155095 A1* | 6/2014 | Albanes | H04W 4/90 |
| | | | 455/456.3 |
| 2014/0247194 A1* | 9/2014 | Durnan | H01Q 7/00 |
| | | | 343/867 |
| 2015/0071440 A1* | 3/2015 | Raghupathy | G06F 21/6245 |
| | | | 380/258 |

\* cited by examiner

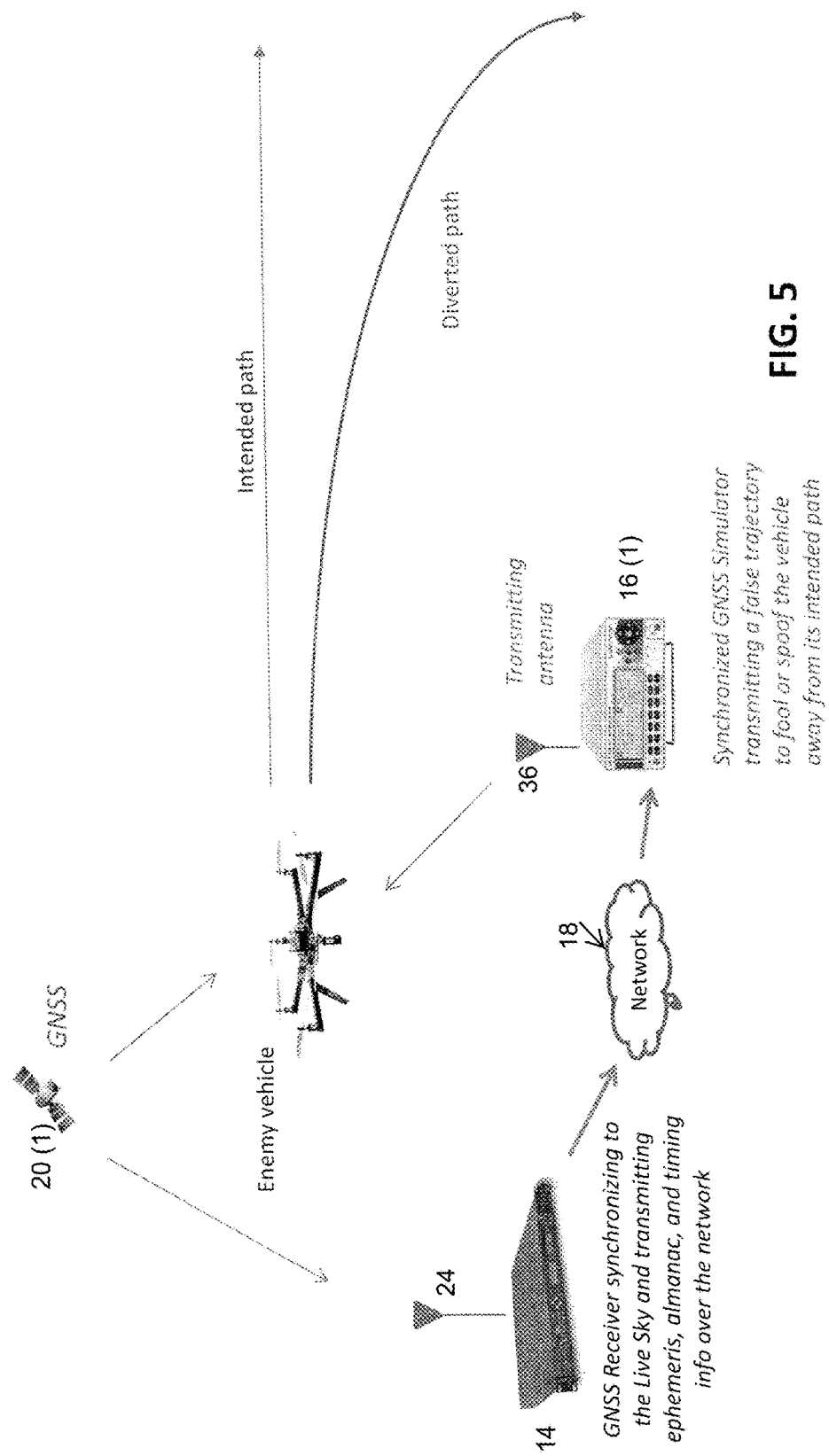

METHODS OF LOCATION USING GNSS SIMULATORS AND DEVICES THEREOF

This application claims the benefit of U.S. Provisional Patent Application Ser. No. 62/155,808 filed May 1, 2015, which is hereby incorporated by reference in its entirety.

BACKGROUND

Signals from Global Navigation Satellite Systems (GNSS), such as the global positioning system (GPS) system utilized in the United States, are very weak and usually cannot be seen indoors or underground. A common method to overcome the problem of receiving GNSS signals indoors or underground is to use a radio frequency (RF) repeater located outdoors to receive the GNSS signal and re-transmit the signal indoors.

However, there are two limitations to this approach. First, the repeater will only render a position at the receiving antenna point (outside), not at the desired inside point. Second, a low-loss coaxial cable and signal amplification are required to bring the signal from the outdoor point to an indoor space and running this special cable can be prohibitively expensive.

SUMMARY

A method for providing a simulated global navigation satellite system (GNSS) signal. The method includes receiving, by a GNSS simulator, a precision timing signal and one or more items of ephemeris data from a GNSS receiver based on a decoded GNSS signal received by the GNSS receiver. The precision timing signal and the one or more items of GNSS ephemeris data are received in a digital format over a communication network. A simulated GNSS signal is generated, by the GNSS simulator, based on the received precision timing signal and one or more items of ephemeris data. The simulated GNSS signal is transmitted, by the GNSS simulator, over a coverage area.

A GNSS simulator includes a process and a memory coupled to the processor which is configured to be capable of executing programmed instructions comprising and stored in the memory to receive a precision timing signal and one or more items of ephemeris data from a GNSS receiver based on a decoded GNSS signal received by the GNSS receiver. The precision timing signal and the one or more items of GNSS satellite data are received in a digital format over a communication network. A simulated GNSS signal is generated based on the received precision timing signal and one or more items of ephemeris data. The simulated GNSS signal is transmitted over a coverage area.

A non-transitory computer readable medium having stored thereon instructions for simulating a global navigation satellite system (GNSS) signal comprising executable code which when executed by a processor, causes the processor to perform steps including receiving a precision timing signal and one or more items of ephemeris data from a GNSS receiver based on a decoded GNSS signal received by the GNSS receiver. The precision timing signal and the one or more items of GNSS satellite data are received in a digital format over a communication network. A simulated GNSS signal is generated based on the received precision timing signal and one or more items of ephemeris data. The simulated GNSS signal is transmitted over a coverage area.

A global navigation satellite system (GNSS) simulation system includes a GNSS receiver positioned to receive GNSS signals from one or more GNSS satellites and an oscillator configured to synchronize with the received GNSS signals. The GNSS receiver is configured to decode the received GNSS signals to obtain a precision timing signal and one or more items of ephemeris data and transmit the decoded precision timing signal and one or more items of ephemeris data in a digital format over a communication network. The GNSS simulation system further includes one or more GNSS simulator computing devices comprising a processor and a memory coupled to the processor which is configured to be capable of executing programmed instructions comprising and stored in the memory to receive the precision timing signal and one or more items of ephemeris data from the GNSS receiver. A simulated GNSS signal is generated based on the received precision timing signal and one or more items of ephemeris data. The simulated GNSS signal is transmitted over a coverage area.

A specialized GNSS receiver that is placed in the open sky and receives the GNSS signals and reduces the pertinent information, including the time and frequency of the signal, as well as relevant ephemeris data, into digital form. That information is then communicated digitally to one or more GNSS simulators. The GNSS simulators re-construct the GNSS signals to align them to a fixed point in the indoor space. Alternatively, the GNSS signals may provide a specific trajectory for spoofing applications.

The GNSS receiver can be located anywhere there is a view of the sky. Its location does not influence performance. Network connections today are ubiquitous (Internet, Ethernet, WiFi) so the interconnect is simple and practical. A varying number of GNSS simulators may be utilized depending on the application in order to transmit the reconstructed GNSS signal so that large indoor spaces can be covered efficiently.

This technology provides a number of advantages including providing enhanced and more cost effective methods and devices for GNSS indoor location using GNSS simulators, as well as a system for GNSS indoor location. The present technology advantageously provides a simulated GNSS signal that is synchronized in real-time to the live sky signal from a GNSS satellite. The simulated signal is directed to a specific indoor location, which allows for more accurate determination of the position of an object while indoors or in a location otherwise lacking access to the live sky GNSS signal. Further, since the simulated signal is synchronized with the live sky signal, the system allows the user's GNSS receiving device to remain seamlessly locked to the GNSS signal as it moves between an outdoor and an indoor environment. Alternatively, the simulated signal can provide a trajectory utilized in spoofing applications.

BRIEF DESCRIPTION OF THE DRAWINGS

FIG. 5 is another exemplary environment including a global navigation satellite system (GNSS) simulation system of the present technology.

DETAILED DESCRIPTION

Figure 1:
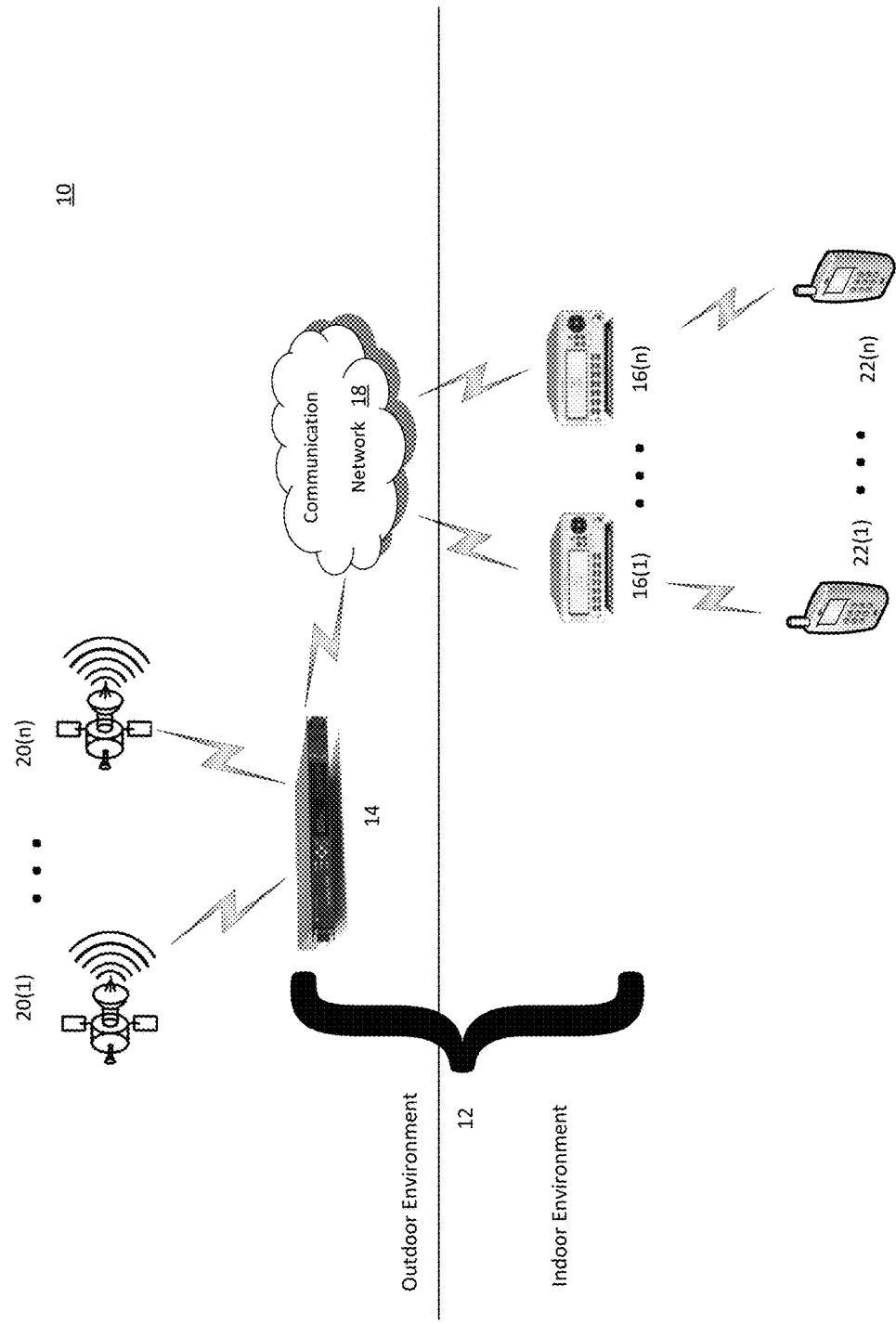
FIG. 1 is an environment including a global navigation satellite system (GNSS) simulation system of the present technology.

An exemplary environment 10 including an exemplary global navigation satellite system (GNSS) simulation system 12 is illustrated in FIG. 1. The GNSS simulation system 12 includes, by way of example, a GNSS receiver device 14 and one or more GNSS simulators 16(1)-16(n), although the GNSS simulation system 12 may include other types and/or numbers of devices, components, and/or elements in other combinations. This technology provides a number of advantages including providing enhanced and more cost effective methods and devices for GNSS indoor location using GNSS simulators, as well as a system for GNSS indoor location.

Referring more specifically to FIG. 1, this example of the environment 10 includes the GNNS receiver device 14 and the one or more GNSS simulators 16(1)-16(n), which are coupled together by a communication network 18, and interact with one or more GNSS satellites 20(1)-20(n) and one or more user devices 22(1)-22(n), although the environment 10 can include other types and/or numbers of devices, components, and/or elements in a variety of other topologies and deployments. The GNSS receiver device 14 may be located in any location, such as the illustrated outdoor environment, such that the GNSS receiver device 14 can communicate with one of the one or more GNSS satellites 20(1)-20(n). The precise location of the GNSS receiver device 14 does not influence performance of the GNSS simulation system 12. The one or more GNSS simulators 16(1)-16(n) are located in an indoor environment or an environment where the signal from the one or more GNSS satellites 20(1)-20(n) is not accessible. The indoor environment may include, by way of example only, a building, a subway station, a parking garage, or a tunnel, although the GNSS simulators 16(1)-16(n) may be located in other indoor environments or environments where a GNSS signal is unavailable. This technology provides a number of advantages including providing precise GNSS positioning to a pre-defined point in areas where GNNS is not typically available without the need for radiofrequency cabling or the installation of a repeater antenna.

Figure 2:
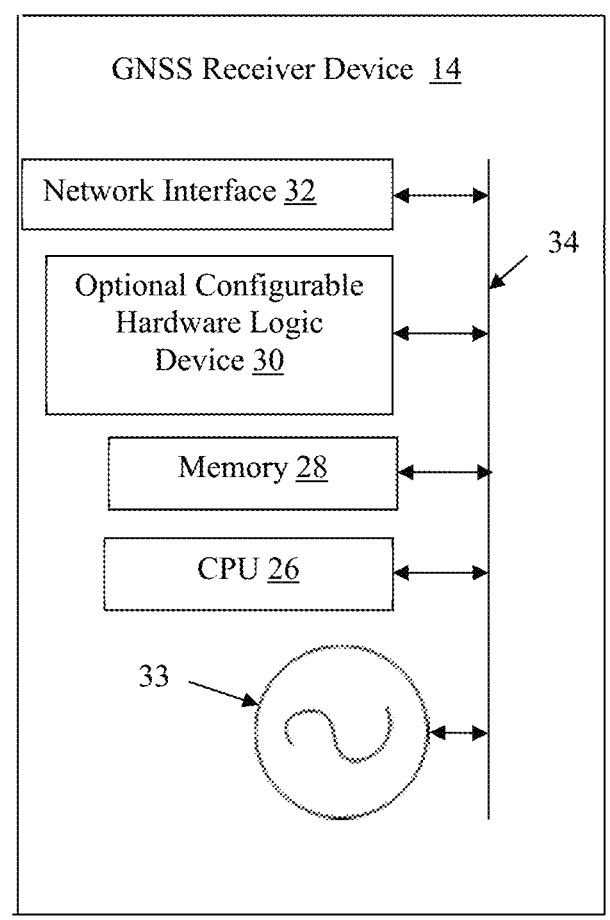
FIG. 2 is an exemplary block diagram of the GNSS receiver as shown in FIG. 1.

Referring more specifically to FIG. 2, in this example the GNSS receiver device 14 is a high precision GPS real time kinematic receiver including an antenna 24 configured to receive GPS signals, although other types and/or numbers of receiver devices can be used to receive signals from other types of positioning systems such as GLONASS, Galileo, Beidou, IRNSS, or QZSS by way of example only. Various types of antennas known in the art for receiving GPS signals may be utilized for the antenna 24. In one example, the antenna 24 of the GNSS receiver device 14 is a high quality anti jam Controlled Radiation Pattern Antenna (CRPA) that provides protection against GNSS interference and jamming. The use of a CRPA antenna for the antenna 24 can provide the interference and jamming prevention advantages to each of the GNSS simulators 16(1)-16(n).

In one example, the GNSS receiver device 14 is a SecureSync GNSS Time Server as manufactured by Spectracom, although other GNSS receiver devices may be utilized. In another example, the GNSS receiver device 14 is a secure GNSS receiver, such as a Selective Availability Anti-Spoofing Module (SAASM) that can receive and decode an encrypted GPS signal, although for example other types and/or numbers of secure GNSS receivers that receive and decode other types of GNSS signals may be utilized. The GNSS receiver device 14 may be located anywhere in view of the live sky for receiving a GNSS signal for use in the present technology as illustrated in FIG. 1, as the precise location of the GNSS receiver device 14 does not influence performance.

Referring again to FIG. 2, the GNNS receiver device 14 includes a central processing unit (CPU) or processor 26, a memory 28, optional configurable hardware logic 30, and a network interface device 32, and an oscillator 33, which are coupled together by a bus 34 or other link, although other the GNSS receiver device 14 may include other types and/or numbers of components and elements in other configurations.

The processor 26 in the GNSS receiver device 14 executes a program of stored instructions for one or more aspects of the present technology as described and illustrated by way of the examples herein, although other types and/or numbers of processing devices and logic could be used and the processor 26 could execute other types and/or numbers of programmed instructions.

The memory 28 in the GNSS receiver device 14 stores these programmed instructions for one or more aspects of the present technology as described and illustrated herein. A variety of different types of memory storage devices, such as a random access memory (RAM) and/or read only memory (ROM) in the timing processor device or a floppy disk, hard disk, CD ROM, DVD ROM, or other computer readable medium which is read from and written to by a magnetic, optical, or other reading and writing system that is coupled to the processor 26 in the GNSS receiver device 14, can be used for the memory 28.

The optional configurable hardware logic 30 of the GNSS receiver device 14 may comprise specialized hardware configured to be capable of implementing one or more steps of this technology as illustrated and described with reference to the examples herein. By way of example only, the optional configurable logic 30 may comprise one or more of field programmable gate arrays (FPGAs), field programmable logic devices (FPLDs), application specific integrated circuits (ASICs) and/or programmable logic units (PLUs).

In one example, the network interface device 32 of the GNSS receiver device 14 operatively couples and facilitates communication between the GNSS receiver device 14 and the one or more GNSS simulators 16(1)-16(n), although other types and/or numbers of communication networks or systems with other types and/or numbers of connections and configurations can be used.

The oscillator 33 of the GNSS receiver device 14 is an internal quartz holdover oscillator, although other types of oscillators, such as a rubidium oscillator, by way of example only, may be utilized in the GNSS receiver device 14. The internal quartz holdover oscillator may be synchronized with the timing signal received from a global positioning satellite, by way of example.

Figure 3:
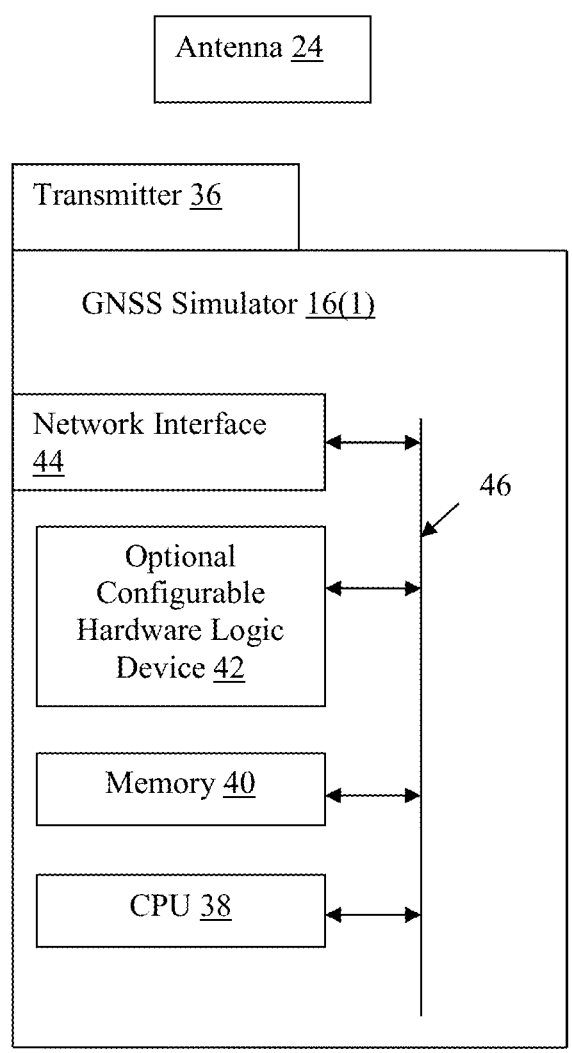
FIG. 3 is an exemplary block diagram of an exemplary GNNS simulator as shown in FIG. 1.
Figure 4:
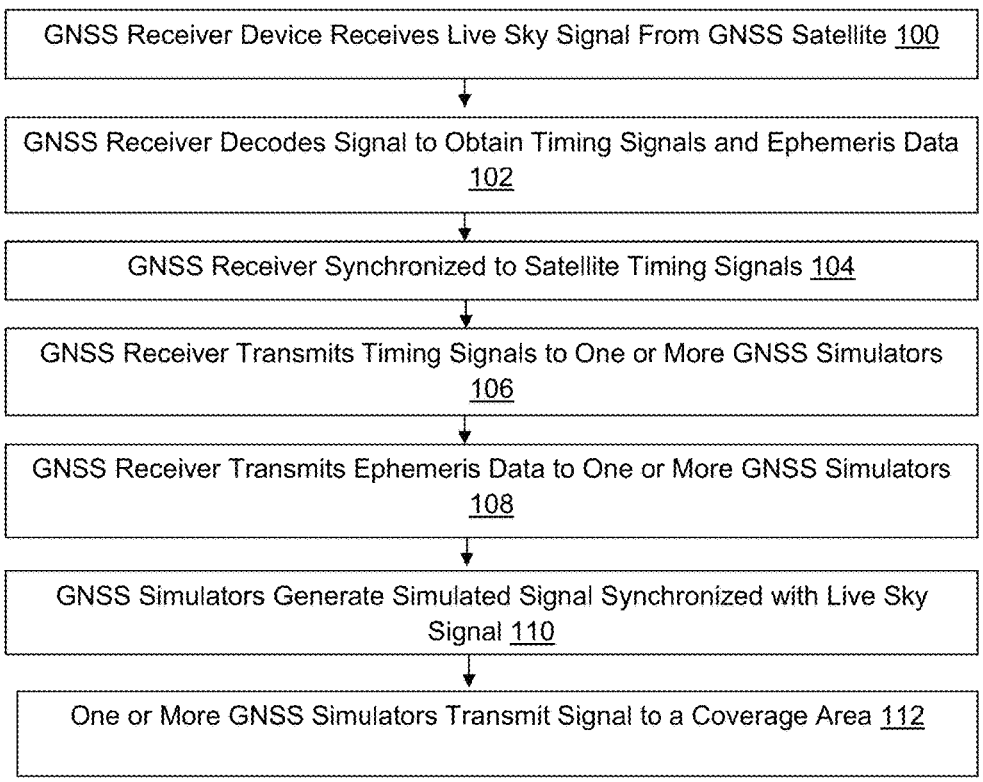
FIG. 4 is an exemplary flow chart for a method of indoor location using the GNSS simulator computing device.

Referring now to FIG. 3, an exemplary GNSS simulator 16(1) of the one or more GNSS simulators 16(1)-16(n) of the present technology is illustrated. Although the GNSS simulator 16(1) is described, it is to be understood that the one or more GNSS simulators 16(1)-16(n) may include the same or similar elements as described with respect to the GNSS simulator 16(1). In one example, the GNSS simulator 16(1) is a GSG Simulator as manufactured by Spectracom, although other types of GNSS simulators may be utilized. The GNSS simulator 16(1) includes a transmitter 36 for providing a radiofrequency signal simulating a received GNSS signal. The GNSS simulator 16(1) also includes a central processing unit (CPU) or processor 38, a memory 40, optional configurable hardware logic 42, and a network interface device 44 which are coupled together by a bus 46 or other link, although other the GNSS simulator 16(1) may include other types and/or numbers of components and elements in other configurations.

The processor 38 in the GNSS simulator 16(1) executes a program of stored instructions for one or more aspects of the present technology as described and illustrated by way of the examples herein, although other types and/or numbers of processing devices and logic could be used and the processor 38 could execute other types and/or numbers of programmed instructions.

The memory 40 in the GNSS simulator 16(1) stores these programmed instructions for one or more aspects of the present technology as described and illustrated herein. A variety of different types of memory storage devices, such as a random access memory (RAM) and/or read only memory (ROM) in the timing processor device or a floppy disk, hard disk, CD ROM, DVD ROM, or other computer readable medium which is read from and written to by a magnetic, optical, or other reading and writing system that is coupled to the processor 38 in the GNSS simulator 16(1), can be used for the memory 40.

The optional configurable hardware logic 42 of the GNSS simulator 16(1) may comprise specialized hardware configured to be capable of implementing one or more steps of this technology as illustrated and described with reference to the examples herein. By way of example only, the optional configurable logic 42 may comprise one or more of field programmable gate arrays (FPGAs), field programmable logic devices (FPLDs), application specific integrated circuits (ASICs) and/or programmable logic units (PLUs).

In one example, the network interface device 44 of the GNSS simulator 16(1) operatively couples and facilitates communication between the GNSS simulator 16(1) and the GNSS receiver device 14, although other types and/or numbers of communication networks or systems with other types and/or numbers of connections and configurations can be used.

Communication network 18 can include one or more local area networks (LANs) and/or wide area networks (WANs). By way of example only, the communication network 18 can use TCP/IP over Ethernet and industry standard protocols, including hypertext transfer protocol (HTTP) and/or secure HTTP (HTTPS), although other types and/or numbers of communication networks may be utilized.

Referring again to FIG. 1, in this example the one or more GNSS satellites 20(1)-20(n) are GPS satellites configured to communicate GPS signals, although GNSS satellites may be communicate other signals associated with other positioning systems such as GLONASS, Galileo, Beidou, IRNSS, or QZSS by way of example only.

The one or more user devices 22(1)-22(n) can include a central processing unit (CPU) or processor, a memory, a network interface device, an input and/or display device interface, and an antenna, which are coupled together by a bus or other link, although other types and/or numbers of network devices could be used. The antennas of the one or more user devices 22(1)-22(n) allow for the receipt of GNSS signals. Further, the one or more user devices 22(1)-22(n) may run GNNS applications that allow for position of the one or more user devices 22(1)-22(n) using the received GNSS signals.

Although examples of the GNSS receiver device 14 and the one or more GNSS simulators 16(1)-16(n) that are part of the GNSS simulation system 12 of the present technology are illustrated and described herein with the examples shown in FIGS. 1-3, it is to be understood that these devices are for exemplary purposes only, as many variations of the specific hardware and software used to implement the examples are possible, as will be appreciated by those skilled in the relevant art(s). In addition, two or more computing systems or devices can be substituted for any one of the systems in any embodiment of the examples.

Aspects of this technology may also be embodied as a non-transitory computer readable medium having instructions stored thereon as described and illustrated by way of the examples herein, which when executed by a processor, cause the processor to carry out the steps necessary to implement the methods of the examples, as described and illustrated herein.

Referring now to FIGS. 1-4, an exemplary method of the present technology will now be described. In step 100, the GNSS receiver device 14 receives a live sky signal from one of the one or more GNSS satellites 20(1)-20(n), such as GNSS satellite 20(1), by way of example. In one example, the GNSS satellite 20(1) is a GPS satellite, although the GNSS receiver device 14 may receive signals from other types of positioning systems, such as GLONASS, Galileo, Beidou, IRNSS, or QZSS, by way of example only. In another example, the GNSS receiver device 14 receives an encrypted GPS signal, although other secure GNSS signals may be utilized. The GNSS receiver device 14 may advantageously be located anywhere that is in view of the live sky to receive the GNSS signal, such as the outdoor environment illustrated in FIG. 1.

Next, in step 102, the GNSS receiver device 14 receives and decodes satellite almanac and ephemeris data from the GNSS satellite 20(1), although the GNSS receiver device 14 may receive and decode satellite almanac and/or ephemeris data from any of the GNSS satellites 20(1)-20(n). The GNSS receiver device 14 may also receive other types and/or amounts of data from the GNSS satellites 20(1)-20(n). The ephemeris data includes data related to the health and the position of the GNSS satellite 20(1) at a given time during its orbit, while the almanac data provides information about the satellite constellation that includes the GNSS satellite 20(1). The GNSS receiver device 14 further receives a timing signal from the GNSS satellite 20(1).

In step 104, the internal quartz oscillator 33 of the GNSS receiver device 14 is synchronized to the timing signal received from the GNSS satellite 20(1). The synchronization of the internal quartz oscillator 33 with the timing signal received from the GNSS satellite provides precise time and frequency data for the GNSS satellite 20(1). Once the GNSS receiver device 14 is synchronized to the live sky signal from the GNSS satellite 20(1), by way of example, the GNSS receiver device 14 can advantageously lose the live sky signal for a period of many hours while remaining synchronized with the live sky signal from the GNSS satellite 20(1).

Next, in step 106, the GNSS receiver device 14 transmits the precise time and frequency data obtained through synchronization of the internal quartz oscillator 33 with the live sky signal from the GNSS satellite 20(1) to one or more of the GNSS simulators 16(1)-16(n) of the present technology via the communication network 18, by way of example, although other types and number of communication networks may transfer signals between the GNSS receiver device 14 and the one or more GNSS simulators 16(1)-16(n). The one or more GNSS simulators 16(1)-16(n) may be located, by way of example only, in an indoor environment or underground where there is no access to the live sky signal from the GNSS satellites 20(1)-20(n) as illustrated in FIG. 1. The indoor environment may include, by way of example only, a building, a subway station, a parking garage, or a tunnel, although the GNSS simulators 16(1)-16(n) may be located in other indoor environments. Alternatively, the GNSS simulators 16(1)-16(n) may be located in outdoor environments where a GNSS signal is unavailable, weak, or otherwise undesirable.

In one example, the timing signals, which include the precise time and frequency data for the GNSS satellite 20(1), by way of example, are transmitted from the GNSS receiver device 14 to the one or more GNSS simulators 16(1)-16(n) over the communication network 18 utilizing a precision time protocol (PTP), although other types and/or numbers of methods may be utilized for transmitting the time and frequency data, such as a network time protocol (NTP), one pulse per second signal, a 10 MHz Frequency Reference signal, or combinations thereof, by way of example only. The GNSS receiver device 14 may be advantageously located remotely from the one or more GNSS simulators 16(1)-16(n) as the devices simply need to communicate over the communication network 18, although other types and/or numbers of communication networks may be utilized.

In step 108, the GNSS receiver device 14 transmits the satellite almanac and ephemeris data received from the GNSS signal from the GNSS satellite 20(1) for example to the one or more GNSS simulators 16(1)-16(n) in a digital format via the communication network, although the satellite almanac and ephemeris may be received by the one or more GNSS simulators 16(1)-16(n) from other locations or devices utilizing assisted GNSS methods known in the art.

Next, in step 110, the one or more GNSS simulators 16(1)-16(n) generate simulated GNSS signals synchronized with the live sky signal received by the GNSS receiver device 14 from the GNSS satellite 20(1). The one or more GNSS simulators 16(1)-16(n) receive the timing signals and data from the GNSS receiver device 14, although the GNSS simulators 16(1)-16(n) may receive other data from the GNSS receiver device. The one or more GNSS simulators 16(1)-16(n) utilize the timing information, along with the satellite almanac and ephemeris data received from the GNSS receiver device 14 to synthesize the simulated GNSS signals that are synchronized with the live sky signal received by the GNSS receiver device 14 from the GNSS satellite 20(1). In one example, the simulated GNSS signal may operate on a different positioning system from the original live sky signal. By way of example only, the live sky signal from the GNSS satellite 20(1) may be a GPS signal, and the one or more GNSS simulators 16(1)-16(n) may then simulate the signal for use in the GLONASS positioning system, although other transformations between different positioning systems may be contemplated using the simulated signal. In another example, the original live sky signal from the GNSS satellite 20(1) may be an encrypted signal, while the simulated signal may be accessible by civilian unencrypted positioning system devices or receivers. In this example, the civilian receivers are able to take advantage of the anti-spoofing assurances of the encrypted system without the required complexity.

In step 112, the one or more GNSS simulators 16(1)-16(n) each transmit the synthesized or simulated GNSS signal using, by example, transmitter 36 of the exemplary GNSS simulator 16(1) as illustrated in FIG. 3. The simulated GNSS signal is transmitted as a Radio Frequency Signal to a specific coverage area in the indoor location in which the one or more GNSS simulators 16(1)-16(n) are located, although the technology may be employed in outdoor environments without GNSS coverage and can be transmitted in other manners. The synthesized GNSS signal simulates a point in the coverage area, such that a GNSS receiver or a user device, such as one or the user devices 22(1)-22(n) located within the coverage will be able to obtain the simulated or synthesized GNSS signal and be accurately located at the single point within the coverage area. This provides accurate location to a point where the GNSS satellite signal would be otherwise unavailable. A number of GNSS simulators 16(1)-16(n) with differing coverage areas can be utilized depending on the size of the indoor area, or other area lacking GNSS coverage, and the desired accuracy.

Referring now to FIG. 5, in another exemplary embodiment, the simulated GNSS signal from the GNSS simulator 16(1), by way of example, may create a realtime trajectory of simulated motion instead of just one fixed point in space. The simulated GNSS signal may be utilized, for example, for spoofing of an enemy vehicle. The enemy vehicle may be using the live sky GNSS signal from GNSS satellite 20(1) for navigation. The GNSS simulator 16(1) simulates the enemy vehicle's trajectory in real time, duplicating the live sky signal. The signal from the GNSS simulator 16(1) is then amplified and broadcast into the vicinity of the enemy vehicle's trajectory. The GNSS simulator 16(1) adjusts its simulated GNSS signal to match both the timing and amplitude of the live sky signal. After a period of time where the vehicle is tracking both the live sky and the simulated signal, the simulated signal from the GNSS simulator 16(1) is adjusted to increase its amplitude and overtake the live signal. The enemy vehicle will now be under control of the simulated signal from the GNSS simulator 16(1), which can be adjusted to fool or "spoof" the vehicle onto a false trajectory.

Accordingly, the present technology advantageously provides methods and devices for GNSS indoor location that utilize a simulated GNSS signal that is synchronized in real-time to the live sky signal from a GNSS satellite. The present technology allows for more accurate determination of the position of an object while indoors or in a location otherwise lacking access to the live sky GNSS signal. Further the system and method of the present technology are more cost effective than current indoor location systems.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing a simulated global navigation satellite system (GNSS) signal, the method comprising:

receiving, by a GNSS simulator, a precision timing signal and one or more items of ephemeris data from a GNSS receiver based on a decoded GNSS signal received by the GNSS receiver, wherein the precision timing signal and the one or more items of GNSS ephemeris data are received in a digital format over a communication network, wherein the GNSS simulator is configured to be capable of receiving the decoded GNSS signal from the GNSS receiver operating on a first GNSS system;

generating, by the GNSS simulator, a simulated GNSS signal based on the received precision timing signal and one or more items of ephemeris data;

transmitting, by the GNSS simulator, the simulated GNSS signal over a coverage area, wherein the GNSS simulator is configured to be capable of transmitting the simulated GNSS signal to operate on a second GNSS system different from the first GNSS system.

2. The method of claim 1, wherein the simulated GNSS signal simulates a pre-defined point located within the coverage area to provide indoor GNNS location.

3. The method of claim 1, wherein the simulated GNSS signal simulates a trajectory within the coverage area.

4. The method as set forth in claim 1, wherein the GNSS receiver comprises one of a GPS, GLONASS, Galileo, IRNSS, QZSS, or Beidou receiver.

5. The method as set forth in claim 1, wherein the GNSS receiver is a secure GNSS receiver.

6. The method as set forth in claim 5, wherein the secure GNSS receiver further comprises a Selective Availability Anti-Spoofing Module (SAASM).

7. The method as set forth in claim 5, wherein the GNSS simulator is configured to be capable of transmitting an unencrypted signal simulated GNSS signal.

8. The method as set forth in claim 1, wherein the GNSS receiver further comprises a Controlled Radiation Pattern Antenna.

9. The method as set forth in claim 1, wherein the received precision timing signal is received using a network time protocol, a precision time protocol, a one pulse per second signal, a 10 MHz reference signal, or a combination thereof.

10. The method as set forth in claim 1, wherein the transmitted simulated GNSS signal is synchronized in real-time to the decoded GNSS signal.

11. A GNSS simulator comprising:
a processor;
a memory coupled to the processor which is configured to be capable of executing programmed instructions comprising and stored in the memory to:
receive a precision timing signal and one or more items of ephemeris data from a GNSS receiver based on a decoded GNSS signal received by the GNSS receiver, wherein the precision timing signal and the one or more items of GNSS satellite data are received in a digital format over a communication network, wherein the GNSS simulator is configured to be capable of receiving the decoded GNSS signal from the GNSS receiver operating on a first GNSS system;
generate a simulated GNSS signal based on the received precision timing signal and one or more items of ephemeris data;
transmit the simulated GNSS signal over a coverage area wherein the GNSS simulator is configured to be capable of transmitting the simulated GNSS signal to operate on a second GNSS system different from the first GNSS system.

12. The device as set forth in claim 11, wherein the simulated GNSS signal simulates a pre-defined point located within the coverage area to provide indoor GNNS location.

13. The device as set forth in claim 11, wherein the simulated GNSS signal simulates a trajectory within the coverage area.

14. The device as set forth in claim 11, wherein the GNSS receiver comprises one of a GPS, GLONASS, Galileo, IRNSS, QZSS, or Beidou receiver.

15. The device as set forth in claim 11, wherein the GNSS receiver is a secure GNSS receiver.

16. The device as set forth in claim 15, wherein the secure GNSS receiver further comprises a Selective Availability Anti-Spoofing Module (SAASM).

17. The device as set forth in claim 15, wherein the GNSS simulator is configured to be capable of transmitting an unencrypted signal simulated GNSS signal.

18. The device as set forth in claim 11, wherein the GNSS receiver further comprises a Controlled Radiation Pattern Antenna.

19. The device as set forth in claim 11, wherein the received precision timing signal is received using a network time protocol, a precision time protocol, a one pulse per second signal, a 10 MHz reference signal, or a combination thereof.

20. The device as set forth in claim 11, wherein the transmitted simulated GNSS signal is synchronized in real-time to the decoded GNSS signal.

21. A non-transitory computer readable medium having stored thereon instructions for simulating a global navigation satellite system (GNSS) signal comprising executable code which when executed by a processor, causes the processor to perform steps comprising:
receiving a precision timing signal and one or more items of ephemeris data from a GNSS receiver based on a decoded GNSS signal received by the GNSS receiver, wherein the precision timing signal and the one or more items of GNSS satellite data are received in a digital format over a communication network, wherein the medium is configured to be capable of receiving the decoded GNSS signal from the GNSS receiver operating on a first GNSS system;
generating a simulated GNSS signal based on the received precision timing signal and one or more items of ephemeris data;
transmitting the simulated GNSS signal over a coverage area wherein the medium is configured to be capable of transmitting the simulated GNSS signal to operate on a second GNSS system different from the first GNSS system.

22. The medium as set forth in claim 21, wherein the simulated GNSS signal simulates a pre-defined point located within the coverage area to provide indoor GNNS location.

23. The medium as set forth in claim 21, wherein the simulated GNSS signal simulates a trajectory within the coverage area.

24. The medium as set forth in claim 21, wherein the GNSS receiver comprises one of a GPS, GLONASS, Galileo, IRNSS, QZSS, or Beidou receiver.

25. The medium as set forth in claim 21, wherein the GNSS receiver is a secure GNSS receiver.

26. The medium as set forth in claim 25, wherein the secure GNSS receiver further comprises a Selective Availability Anti-Spoofing Module (SAASM).

27. The medium as set forth in claim 25, wherein the processor is configured to be capable of transmitting an unencrypted signal simulated GNSS signal.

28. The medium as set forth in claim 21, wherein the GNSS receiver further comprises a Controlled Radiation Pattern Antenna.

29. The medium as set forth in claim 21, wherein the received precision timing signal is received using a network time protocol, a precision time protocol, a one pulse per second signal, a 10 MHz reference signal, or a combination thereof.

30. The medium as set forth in claim 21, wherein the transmitted simulated GNSS signal is synchronized in real-time to the decoded GNSS signal.

31. A global navigation satellite system (GNSS) simulation system comprising:

a GNSS receiver positioned to receive GNSS signals from one or more GNSS satellites and comprising an oscillator configured to synchronize with the received GNSS signals, wherein the GNSS receiver is configured to decode the received GNSS signals to obtain a precision timing signal and one or more items of ephemeris data and transmit the decoded precision timing signal and one or more items of ephemeris data in a digital format over a communication network;

one or more GNSS simulators, the one or more GNSS simulator computing devices comprising a processor and a memory coupled to the processor which is configured to be capable of executing programmed instructions comprising and stored in the memory to:

receive the precision timing signal and one or more items of ephemeris data from the GNSS receiver wherein the one or more GNSS simulators are configured to be capable of receiving the decoded GNSS signal from the GNSS receiver operating on a first GNSS system;

generate a simulated GNSS signal based on the received precision timing signal and one or more items of ephemeris data;

transmit the simulated GNSS signal over a coverage area wherein the one or more GNSS simulators are configured to be capable of transmitting the simulated GNSS signal to operate on a second GNSS system different from the first GNSS system.

32. The system as set forth in claim 31, wherein the simulated GNSS signal simulates a pre-defined point located within the coverage area to provide indoor GNNS location.

33. The system as set forth in claim 31, wherein the simulated GNSS signal simulates a trajectory within the coverage area.

34. The system as set forth in claim 31, wherein the GNSS receiver comprises one of a GPS, GLONASS, Galileo, IRNSS, QZSS, or Beidou receiver.

35. The system as set forth in claim 31, wherein the GNSS receiver is a secure GNSS receiver.

36. The system as set forth in claim 35, wherein the GNSS receiver further comprises a Selective Availability Anti-Spoofing Module (SAASM).

37. The system as set forth in claim 35, wherein the GNSS simulator is configured to be capable of transmitting an unencrypted signal simulated GNSS signal.

38. The system as set forth in claim 31, wherein the GNSS receiver further comprises a Controlled Radiation Pattern Antenna.

39. The system as set forth in claim 31, wherein the received precision timing signal is received using a network time protocol, a precision time protocol, a one pulse per second signal, a 10 MHz reference signal, or a combination thereof.

40. The system as set forth in claim 31, wherein the transmitted simulated GNSS signal is synchronized in real-time to the decoded GNSS signal.

* * * * *